United States Patent
Kim

(10) Patent No.: US 9,849,801 B2
(45) Date of Patent: Dec. 26, 2017

(54) BATTERY CONTROL DEVICE FOR STANDARDIZATION OF BATTERY

(71) Applicant: LG CHEM, LTD., Seoul (KR)

(72) Inventor: Jihoon Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 157 days.

(21) Appl. No.: 14/890,342

(22) PCT Filed: Oct. 31, 2014

(86) PCT No.: PCT/KR2014/010348
§ 371 (c)(1),
(2) Date: Nov. 10, 2015

(87) PCT Pub. No.: WO2015/065092
PCT Pub. Date: May 7, 2015

(65) Prior Publication Data
US 2016/0075253 A1    Mar. 17, 2016

(30) Foreign Application Priority Data

Oct. 31, 2013  (KR) .................. 10-2013-0130746

(51) Int. Cl.
*H02J 7/00* (2006.01)
*B60L 11/18* (2006.01)
(Continued)

(52) U.S. Cl.
CPC ......... *B60L 11/1861* (2013.01); *B60L 3/0046* (2013.01); *B60L 3/12* (2013.01);
(Continued)

(58) Field of Classification Search
USPC .................. 320/108, 109, 107, 124, 134
See application file for complete search history.

(56) References Cited

U.S. PATENT DOCUMENTS 8,552,686 B2    10/2013  Jung et al.
2006/0255766 A1  11/2006  Yoon et al.
(Continued)

FOREIGN PATENT DOCUMENTS

| CN | 102009599 | 4/2011 |
|---|---|---|
| KR | 10-2005-0069056 A | 7/2005 |
| KR | 10-2006-0111946 A | 10/2006 |

OTHER PUBLICATIONS

International Search Report dated Jan. 28, 2015, issued in PCT/KR2014/010348.
Written Opinion of the International Searching Authority dated Jan. 28, 2015, issued in PCT/KR2014/010348.

*Primary Examiner* — Brian Ngo
(74) *Attorney, Agent, or Firm* — Birch, Stewart, Kolasch & Birch, LLP

(57) ABSTRACT

Provided is a battery control device for the standardization of a battery, and more particularly, to a battery control device for the standardization of a battery, which allows one or more application modules performing functions of a battery management system (BMS) to independently operate with respect to a time, prevents data shared by one or more respective application modules from being subordinate to each other, and further, allows one or more application modules to perform functions thereof regardless of a change of the mode.

9 Claims, 4 Drawing Sheets

(51) Int. Cl.
*B60L 3/00* (2006.01)
*B60L 3/12* (2006.01)
*B60L 15/20* (2006.01)

(52) U.S. Cl.
CPC ............ *B60L 11/1803* (2013.01); *B60L 15/20* (2013.01); *B60L 2240/12* (2013.01); *B60L 2240/421* (2013.01); *B60L 2240/423* (2013.01); *B60L 2240/545* (2013.01); *B60L 2240/547* (2013.01); *B60L 2240/549* (2013.01); *B60L 2250/26* (2013.01); *Y02T 10/645* (2013.01); *Y02T 10/7005* (2013.01); *Y02T 10/705* (2013.01); *Y02T 10/7044* (2013.01); *Y02T 10/72* (2013.01); *Y02T 10/7275* (2013.01)

(56) References Cited

U.S. PATENT DOCUMENTS

| | | | |
|---|---|---|---|
| 2008/0233469 A1 | 9/2008 | Drozdz et al. | |
| 2009/0102424 A1* | 4/2009 | Tien ..................... | H02J 7/0022 320/124 |
| 2012/0191390 A1 | 7/2012 | Kang et al. | |
| 2013/0304142 A1* | 11/2013 | Curtin .................. | A61N 1/3975 607/5 |
| 2014/0191713 A1* | 7/2014 | Hong ................... | H02J 7/0029 320/108 |
| 2014/0292271 A1* | 10/2014 | Ohkuma ............... | H01M 10/44 320/109 |
| 2014/0325218 A1* | 10/2014 | Shimizu ............... | H04L 9/3271 713/168 |

* cited by examiner

BATTERY CONTROL DEVICE FOR STANDARDIZATION OF BATTERY

TECHNICAL FIELD

This application claims priority to and the benefit of Korean Patent Application No. 10-2013-0130746 filed in the Korean Intellectual Property Office on Oct. 31, 2013, the entire contents of which are incorporated herein by reference.

The present invention relates to a battery control device for the standardization of a battery, and more particularly, to a battery control device for the standardization of a battery, which allows one or more application modules performing functions of a battery management system (BMS) to independently operate with respect to a time, prevents data shared by one or more respective application modules from being subordinate to each other, and further, allows one or more application modules to perform functions thereof regardless of a change of the mode.

BACKGROUND ART

In general, batteries used for an electric vehicle (EV), a hybrid vehicle (HV), and a home or industry, that is, secondary batteries are high in application easiness depending on a product group and have electrical characteristics such as high energy density, and the like.

The secondary batteries have attracted public attention as a new energy source for friendly-environment and improved energy efficiency in that no by-product is generated depending on use of energy in addition to a primary advantage of remarkably reducing use of fossil fuel.

In this case, when multiple secondary batteries alternately perform charging and discharging, the multiple secondary batteries need to be managed so that the batteries maintain an appropriate operating state and performance by efficiently controlling the charging and discharging of the secondary batteries.

To this end, a battery management system (BMS) that manages a state and a performance of the battery is provided. The BMS measures current, voltage, a temperature, and the like of the battery to estimate a state of charging (SOC) of the battery based on the measured current, voltage, temperature, and the like and controls the SOC so that fuel consumption efficiency is highest. The SOC of the battery that performs the charging and discharging needs to be accurately measured in order to accurately control the SOC.

Meanwhile, since one or more application modules used in the battery management system in the related art which cannot be standardized, which is presented in the present invention cannot independently operate with respect to a time and sequentially operate at once and data shared by one or more respective application modules are dependent on each other, a change of specific data causes a change of data of the other application module and further the mode of the specific application module is involved in the change of the mode of the other application module, and as a result, when the specific application module is changed, a function of the specific application module is not normally performed.

Further, in an AUTomotive System Architecture (AUTOSAR) meaning an automotive standard software architecture, in the related art, a software module cannot be simultaneously applied to application layers of an opened AUTOSAR and a non-opened AUTOSAR (NON-AUTOSAR), and as a result, there is inconvenience that the AUTOSAR Compliant standard software module should be individually developed according to the opened AUTOSAR and the non-opened AUTOSAR.

Therefore, the present inventor has invented a battery control device for the standardization of a battery, which allows one or more application modules performing functions of a battery management system to independently operate with respect to a time, prevents data shared by one or more respective application modules from being subordinate to each other, and further, allows one or more application modules to perform functions thereof regardless of a change of the mode in order to solve the problem of the battery management system which cannot be standardized in the related art.

DETAILED DESCRIPTION OF THE INVENTION

Technical Problem

The present invention is contrived to solve the aforementioned problems and an object of the present invention is to provide a battery control device for the standardization of a battery, which allows one or more application modules performing functions of a battery management system to independently operate with respect to a time, prevents data shared by one or more respective application modules from being subordinate to each other, and further, allows one or more application modules to perform functions thereof regardless of a change of the mode.

In more detail, another object of the present invention is to provide a battery control device for the standardization of a battery, which removes dependency for a time among one or more application modules and determines and calls an execution time and an execution sequence of functions included in the corresponding application modules to allow the functions of the respective application modules to be independently executed and called.

Further, yet another object of the present invention is to provide a battery control device for the standardization of a battery, which relays sharing data to be shared among one or more application modules in the middle to remove data dependency of the respective application modules.

Still another object of the present invention is to provide a battery control device for the standardization of a battery, which takes charges of charging modes of one or more application modules to arbitrarily change the modes of the respective application modules.

Technical Solution

Among exemplary embodiments, an exemplary embodiment of the present invention provides a battery control device for the standardization of a battery, which includes one or more application modules and one or more hardware devices, including: an application layer unit independently controlling an operation among one or more application modules; a module relay layer unit relaying data transceiving among one or more application modules; and a basic program layer unit calling one or more hardware devices by receiving a call signal from the module relay layer unit.

The application layer unit may include a mode control unit controlling modes of one or more application modules, a data control unit controlling data sharing among one or more application modules, and an execution control unit determining and calling an execution time and an execution sequence of functions included in one or more application modules.

The mode control unit may exchange data with the data control unit and further, exchange data for the mode with the execution control unit.

The data control unit may exchange the data for the mode with the mode control unit and one or more application modules.

The execution control unit may include one or more execution functions, and one or more execution functions may be called from a task included in basic software (BSW).

The module relay layer unit may include a request signal receiving unit receiving one or more function call request signals from one or more manager modules, one or more application modules, and one or more service modules included in the basic program layer unit, and a relay unit selecting the modules corresponding to one or more received function call request signals among one or more manager modules, application modules, and service modules and calling the respective selected modules to relay the modules to each other.

The relay unit may include one or more call functions corresponding to one or more function call request signals.

The module relay layer unit may include a platform abstraction layer (PAL).

The module relay layer unit may provide a platform abstraction layer function set (PAL API) that is capable of accessing a service function set (service API) included in the basic program layer unit to the application layer unit.

One or more application modules may access the basic program layer unit through the platform abstraction layer function set.

Advantageous Effects

According to the present invention, since dependency for a time among one or more application modules is removed and an execution time and an execution sequence of functions included in the corresponding application modules are determined and called to allow the functions of the respective application modules to be independently executed and called, mode independency of one or more respective application modules can be secured and independency from a basic program can be secured with hardware.

Further, since sharing data to be shared among one or more application modules is relayed, data dependency of one or more respective application modules can be removed and a change of data of the other application module due to a change of data of a specific application module can be prevented.

Since the present invention is not directly connected with one or more application modules and further, can control a mode change of the application module without being included in one or more application modules, even though a mode condition of a specific application module is changed, the mode change of the corresponding specific application module can be independently performed without replacing the corresponding specific application module.

Further, since functions performed by the respective application modules can be independently controlled for each time, data, and mode, the respective application modules can be separated and reused.

BEST MODE

Hereinafter, preferred embodiments will be presented in order to help understanding the present invention. However, the exemplary embodiments are just provided to easily understand the present invention and contents of the present invention are not limited to the exemplary embodiments.

Figure 1:
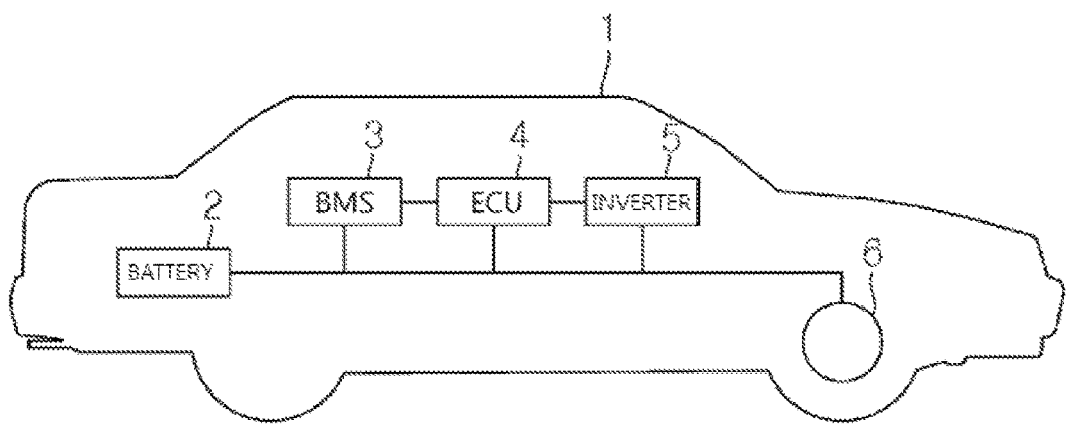
FIG. 1 is a block diagram illustrating a configuration of an electric vehicle 1.

FIG. 1 is a block diagram illustrating a configuration of an electric vehicle 1.

Referring to FIG. 1, in general, the electric vehicle 1 may be configured to include a battery 2, a battery management system (BMS) 3, an electronic control unit (ECU) 4, an inverter 5, and a motor 6.

The battery 2 is an electric energy source that drives the electric vehicle 1 by providing drive force to the motor 6. The battery 2 may be charged or discharged by the inverter 5 depending on driving of the motor 6 or an internal combustion engine (not illustrated).

Herein, the type of battery 2 is not particularly limited and may be constituted by, for example, a lithium ion battery, a lithium polymer battery, a nickel cadmium battery, a nickel hydrogen battery, a nickel zinc battery, and the like.

Further, the battery 2 is formed by a pack in which a plurality of battery cells are connected in series or in parallel. In addition, one or more packs are provided to form the battery 2.

The BMS 3 estimates a state of the battery 2 and manages the battery 2 by using the estimated state information. For example, the BMS 3 estimates and manages the state information of the battery 2, which includes a state of charging (SOC), a state of health (SOH), a maximum input/output power permission amount, an output voltage, and the like of the battery 2. In addition, the BMS 3 controls the charging or discharging of the battery 2 by using the state information and furthermore, may estimate an exchange time of the battery 2.

The ECU 4 is an electronic control device that controls a state of the electric vehicle 1. For example, the ECU 4 determines a torque degree based on information including an accelerator, a brake, a speed, and the like and controls an output of the motor 6 to be suitable for torque information.

Further, the ECU 4 transmits a control signal to the inverter 5 so as to charge or discharge the battery 2 based on the state information including the SOC, SOH, and the like of the battery 2 received by the BMS 3.

The inverter 5 allows the battery 2 to be charged or discharged based on the control signal of the ECU 4.

The motor 6 drives the electric vehicle 1 based on control information (for example, torque information) received from the ECU 4 by using electric energy of the battery 2.

Since the electric vehicle 1 is driven by using the electric energy of the battery 2, the battery 2 and the motor 6 may be connected through various circuits.

Meanwhile, the BMS 3 for the battery 2 may control execution of functions of one or more application modules connected with the corresponding BMS 3 and in the related art, there no device that determines an execution time and an execution sequence of the functions of the respective application modules.

Further, in the related art, the types of data (for example, a voltage and current measurement value, and the like of the battery 2) transmitted by one or more application modules connected with the BMS 3 for the battery 2 are different from each other and the resulting data compatibility between the application modules is required.

In addition, in the related art, one or more application modules connected with the BMS 3 for the battery 2 may be configured so as to change the modes and a mode change condition varies for each project.

For example, Project A in which when a voltage measurement value measured through a specific application module is 5 V or higher, the mode is changed from B to C or Project B in which when the voltage measurement value is 6 V or higher, the mode is changed from B to C corresponds to the project.

That is, a separate mode change device is required to change the modes of one or more application modules and when the mode change device is positioned in each of the application modules or directly connected with one or more application modules, the specific application module may not be reused in the case where the mode condition of the project is to be changed.

Therefore, in the present invention, a battery control device 100 for the standardization of a battery will be described with reference to FIGS. 2 to 6 to be described below, which allows one or more application modules performing functions of a battery management system (BMS) to independently operate with respect to a time, prevents data shared by one or more respective application modules from being subordinate to each other, and further, allows one or more application modules to perform functions thereof regardless of a change of the mode and is included in the BMS 3 to execute the function according to a control command of the BMS 3.

Figure 2:
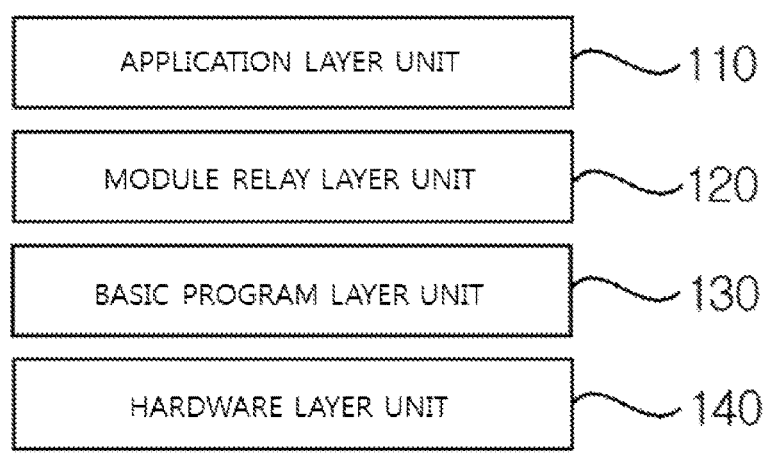
FIG. 2 is a block diagram illustrating a configuration of a battery control device 100 for the standardization of a battery according to an exemplary embodiment of the present invention.
Figure 3:
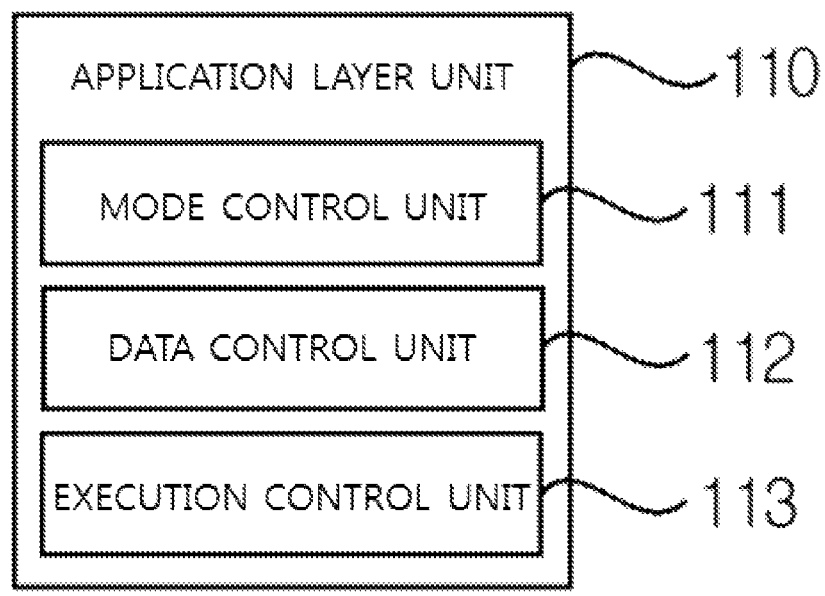
FIG. 3 is a block diagram illustrating a configuration of an application layer unit 110 illustrated in FIG. 2.
Figure 4:
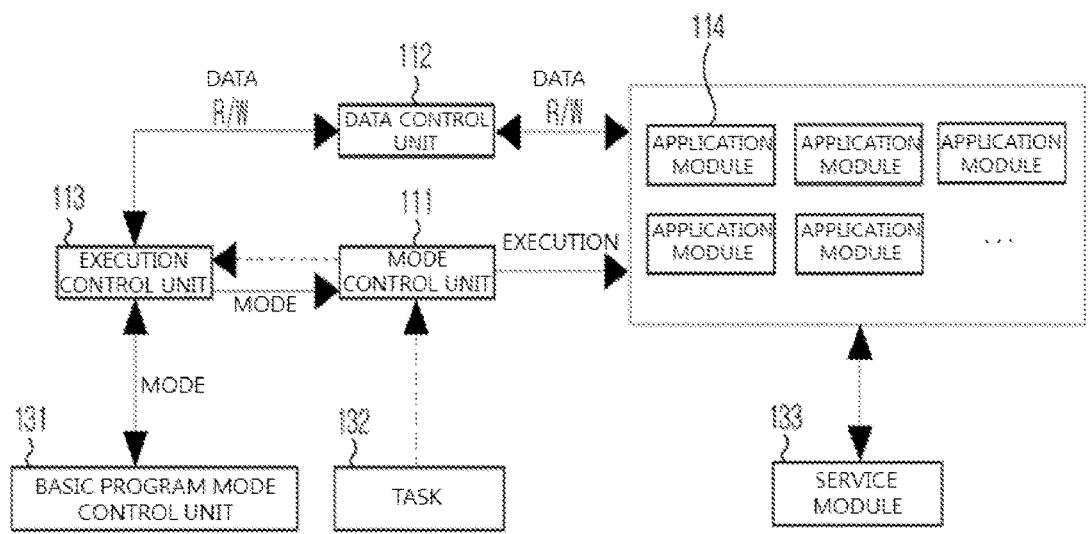
FIG. 4 is a diagram illustrating an operating state of the application layer unit 110 illustrated in FIG. 2.
Figure 5:
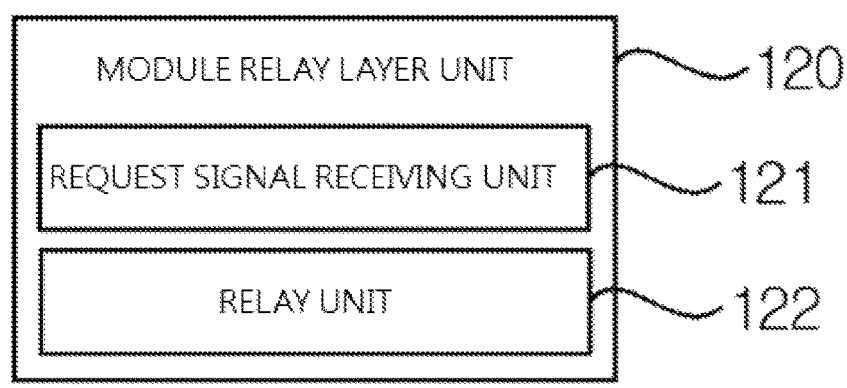
FIG. 5 is a block diagram illustrating a configuration of a module relay layer unit 120 illustrated in FIG. 2.
Figure 6:
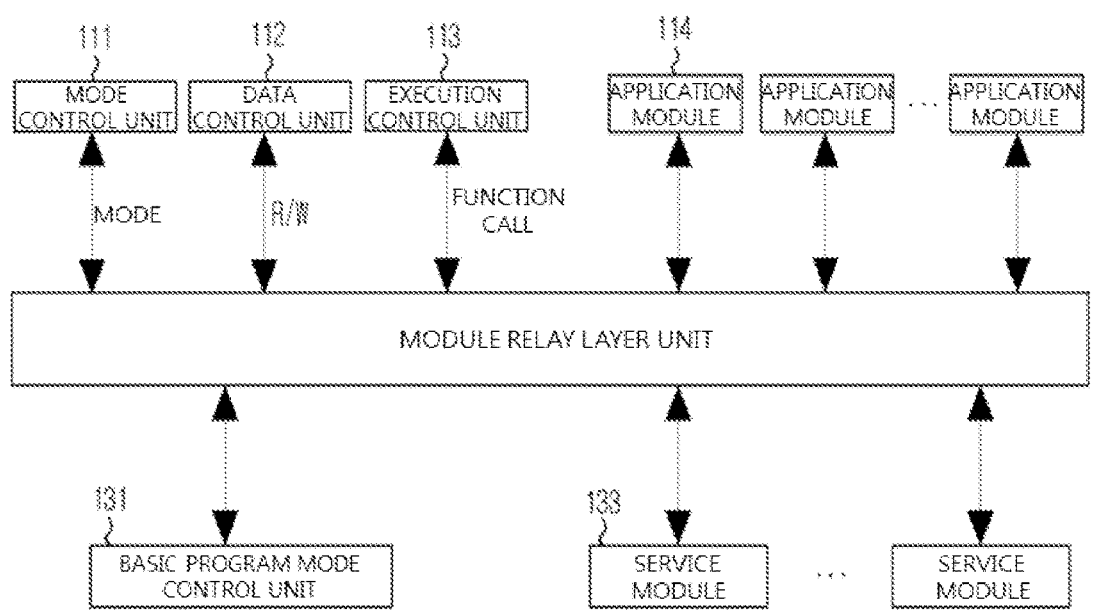
FIG. 6 is a diagram illustrating an interface among the application layer unit 110, the module relay layer unit 120, and a basic program layer unit 130 according to the exemplary embodiment of the present invention.

FIG. 2 is a block diagram illustrating a configuration of a battery control device 100 for the standardization of a battery according to an exemplary embodiment of the present invention. FIG. 3 is a block diagram illustrating a configuration of an application layer unit 110 illustrated in FIG. 2. FIG. 4 is a diagram illustrating an operating state of the application layer unit 110 illustrated in FIG. 2. FIG. 5 is a block diagram illustrating a configuration of a module relay layer unit 120 illustrated in FIG. 2. FIG. 6 is a diagram illustrating an interface among the application layer unit 110, the module relay layer unit 120, and a basic program layer unit 130 according to the exemplary embodiment of the present invention.

Referring to FIGS. 2 to 6, the battery control device 100 for the standardization of a battery according to the exemplary embodiment of the present invention includes an application layer unit 110, a module relay layer unit 120, and a basic program layer unit 130.

First, the application layer unit 110 may serve to independently control an operation among one or more application modules 114.

Herein, the application module 114 may mean modules that perform a function and include a measurement module, an estimation module, a diagnosis module, a calculation module, a communication module, a manager module, a recording module, and the like.

The application layer unit 110 that performs such a role may include a mode control unit 111 controlling modes of one or more application modules 114, a data control unit 112 controlling data sharing among one or more application modules 114, and an execution control unit 113 determining and calling an execution time and an execution sequence of functions included in one or more application modules 114.

According to a specific project (for example, a project in which when a voltage measurement value measured by Project A (an analog/digital converter (ADC)) is 5 V or higher, a mode of a specific application module 140 is changed from B to C), the mode control unit 111 may serve to change the mode of the application module 140.

The mode control unit 111 may include a first data receiving unit (not illustrated) receiving first data from the data control unit 112, a second data receiving unit (not illustrated) receiving second data from a basic program mode control unit 131, and a mode determining unit (not illustrated) determining modes of one or more respective application modules 114 based on the first and second data.

Herein, the first data may mean all types of data and the second data may mean data including mode state data of one or more respective application modules 114. For example, the second data may include mode state data (mode A, mode B, and the like) of the application module 114 and the mode state data may be used as a basis to determine a mode of the application module 114 by the mode determining unit.

In addition, the mode control unit 111 may exchange the data with data control unit 112 to be described below and further, exchange data (mode signal) for the mode with the execution control unit 113.

The data control unit 112 may include a data transceiving unit transceiving data from one or more application modules 114, a data storing unit storing one or more data received from the data transceiving unit, and a data managing unit selecting and managing data required to execute the function of the application module 114 among the stored data.

Herein, the data may mean result data generated by executing the function among one or more application modules 114 and may include a voltage value and a current value measured from the application module 114.

In addition, the data transceiving unit may include a share-interface.

The share-interface may serve to connect one or more application modules 114 and the data storing unit. In this case, the share-interface may include a write interface that allows the data included in the application module 114 to be input in the data storing unit and a read interface that allows the application module 114 to read the data input in the data storing unit.

The execution control unit 113 serves to determine and call the execution time and the execution sequence of the functions included in the application module 114, and includes a mode signal receiving unit serving to receive the mode signal from the mode control unit 111, a sequence determining unit determining the execution time and the execution sequence of the functions included in one or more respective application modules 114 to correspond to the received mode signal, and a call unit selecting each application module 114 corresponding to the received mode signal and calling the function included in the selected application module 114.

The execution control unit 113 may include one or more execution functions and the execution functions may be called from a task 132 included in the basic program layer unit 130.

Meanwhile, the application layer unit 110 may have a software hierarchical structure constituted by the mode control unit 111, the data control unit 112, and the execution control unit 113 as well as the hardware configuration.

Next, the module relay layer unit 120 may serve to relay data transceiving among one or more application modules 114.

The module relay layer unit 120 may include a request signal receiving unit 121 receiving one or more function call request signals from one or more manager modules and one or more application modules 114, and one or more service modules 133 included in the basic program layer unit 130 and a relay unit 122 selecting a module corresponding to one or more received function call request signals among one or more manager modules, the application module 114, and the service module 133 and relaying the selected respective modules to each other by calling the selected respective modules.

The request signal receiving unit 121 may include first and second request signal receiving units receiving one or more function call request signals from one or more manager modules included in the application layer unit 110 and one or more service modules 133 included in the basic program layer unit 130.

A function called to execute the function of the application module 114 may be received among the call functions included in the relay unit 122 to be described below through the first request signal receiving unit and a call function for calling the specific service module 113 among one or more service modules 133 may be received through the second request signal receiving unit.

The relay unit 122 may serve to share two application modules 114 by connecting two application modules 114 and when a first function call request signal is received through the first request signal receiving unit, the relay unit 122 may select a first call function corresponding to the first function call request signal among one or more call functions and relay the specific application module 114 corresponding thereto and a first manager module to each other through the selected first call function.

Further, the relay unit 122 may select the second call function corresponding to the second function call request signal among one or more call functions and relay the specific service module 133 corresponding thereto and the second application module through the selected second call function when the second function call request signal is received through the second request signal receiving unit.

Further, the relay unit 122 may select the third call function corresponding to the third function call request signal among one or more call functions and relay the specific application module 114 corresponding thereto and the second service module through the selected third call function when the third function call request signal is received through the third request signal receiving unit.

In the exemplary embodiment, the module relay layer unit 120 may be a device having a platform abstraction layer (PAL) structure which is a software hierarchical structure. The platform abstraction layer (PAL) may serve as an AUTOSAR runtime environment (RTE) that secures independency among operations and functions of AUTOSAR standard software modules.

In the exemplary embodiment, the module relay layer unit 120 may serve to provide a platform abstraction layer function set (PAL API) which may access a service function set (service API) included in the basic program layer unit 130 to the application layer unit 110.

In addition, one or more application modules 114 may access the basic program layer unit 130 through the platform abstraction layer function set (PAL API).

The basic program layer unit 130 may serve to call one or more hardware by receiving the call signal from the module relay layer unit 120.

Herein, the hardware may mean devices that perform a hardware operation of a secondary battery by receiving a function execution command from the BMS 3 and may correspond to, for example, a voltage measuring device measuring a voltage of the battery 2, a voltage determining device determining the measured voltage value, a diagnosis device diagnosing low voltage or overvoltage through the determined voltage value, a calculation device comparing and calculating the voltage values, a communication device transceiving data with the BMS 3, a control device transceiving a control command from the BMS 3, and a write device writing data in a separate memory.

In the exemplary embodiment, the battery control device 100 for the standardization of a battery according to the present invention may include the hardware layer unit 140 and the hardware layer unit 140 may include all hardware devices called by the basic program layer unit 130.

The present invention has been described with reference to the preferred embodiments. However, it will be appreciated by those skilled in the art that various modifications and changes of the present invention can be made within the scope without departing from the spirit and the scope which are defined in the appended claims and their equivalents.

The invention claimed is:

1. A battery control device for the standardization of a battery, which includes one or more application modules and one or more hardware devices, comprising:
    an application layer unit independently controlling an operation among one or more application modules;
    a module relay layer unit relaying data transceiving among one or more application modules; and
    a basic program layer unit calling one or more hardware devices by receiving a call signal from the module relay layer unit,
    wherein the application layer unit includes a mode control unit controlling modes of one or more application modules, a data control unit controlling data sharing among one or more application modules, and an execution control unit determining and calling an execution time and an execution sequence of functions included in one or more application modules.

2. The battery control device of claim 1, wherein the mode control unit exchanges data with the data control unit and further, exchanges data for the mode with the execution control unit.

3. The battery control device of claim 1, wherein the data control unit exchanges the data for the mode with the mode control unit and one or more application modules.

4. The battery control device of claim 1, wherein the execution control unit includes one or more execution functions, and one or more execution functions are called from a task included in basic software (BSW).

5. A battery control device for the standardization of a battery, which includes one or more application modules and one or more hardware devices, comprising:
    an application layer unit independently controlling an operation among one or more application modules;

a module relay layer unit relaying data transceiving among one or more application modules; and a basic program layer unit calling one or more hardware devices by receiving a call signal from the module relay layer unit, wherein the module relay layer unit includes a request signal receiving unit receiving one or more function call request signals from one or more manager modules, one or more application modules, and one or more service modules included in the basic program layer unit, and a relay unit selecting the modules corresponding to one or more received function call request signals among one or more manager modules, application modules, and service modules and calling the respective selected modules to relay the modules to each other.

6. The battery control device of claim 5, wherein the relay unit includes one or more call functions corresponding to one or more function call request signals.

7. The battery control device of claim 5, wherein the module relay layer unit includes a platform abstraction layer (PAL).

8. The battery control device of claim 5, wherein the module relay layer unit provides a platform abstraction layer function set (PAL API) that is capable of accessing a service function set (service API) included in the basic program layer unit to the application layer unit.

9. The battery control device of claim 8, wherein one or more application modules access the basic program layer unit through the platform abstraction layer function set.

* * * * *